United States Patent
Itakura

(10) Patent No.: US 12,001,377 B2
(45) Date of Patent: Jun. 4, 2024

(54) UNIVERSAL SERIAL BUS PORT CONTROLLER AND ELECTRONIC APPARATUS

(71) Applicant: ROHM Co., LTD., Kyoto (JP)

(72) Inventor: Nobutaka Itakura, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 0 days.

(21) Appl. No.: 17/818,098

(22) Filed: Aug. 8, 2022

(65) Prior Publication Data

US 2023/0052051 A1 Feb. 16, 2023

(30) Foreign Application Priority Data

Aug. 10, 2021 (JP) .................................. 2021-130922

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
CPC ..................... G06F 13/4282; G06F 2213/0042
See application file for complete search history.

(56) References Cited

U.S. PATENT DOCUMENTS

| | | | | |
|---|---|---|---|---|
| 2011/0133757 A1* | 6/2011 | Chae | ....................... | G01R 31/64 324/678 |
| 2013/0035819 A1* | 2/2013 | Wolft | ................... | B60L 3/0046 701/22 |
| 2015/0229119 A1* | 8/2015 | Tao | ....................... | H02H 1/0007 361/91.1 |
| 2015/0340890 A1* | 11/2015 | Yao | .................... | H02M 3/33523 320/114 |
| 2018/0019585 A1* | 1/2018 | Koga | ....................... | H02H 7/26 |
| 2018/0097372 A1* | 4/2018 | Li | .......................... | H02J 7/0048 |
| 2021/0218258 A1* | 7/2021 | Chen | ........................ | H02H 7/18 |
| 2021/0234378 A1* | 7/2021 | Nakayama | ............ | H02J 7/0016 |

FOREIGN PATENT DOCUMENTS

JP 6838879 3/2021

* cited by examiner

*Primary Examiner* — Henry Tsai
*Assistant Examiner* — Harry Z Wang
(74) *Attorney, Agent, or Firm* — CHIP LAW GROUP

(57) ABSTRACT

Disclosed herein is a universal serial bus port controller on a source side. The universal serial bus port controller is compatible with universal serial bus Type-C. A source is equipped with the universal serial bus port controller including a power supply terminal, a power supply circuit, a switch connected between an output of the power supply circuit and the power supply terminal, a capacitor connected to the power supply terminal, and a discharge resistance and a discharge switch connected in series with each other between the power supply terminal and a ground line. The universal serial bus port controller includes an abnormality detector which detects an output voltage of the power supply terminal a plurality of times after the discharge switch is turned on and detects an abnormality on the basis of a temporal change in the output voltage.

12 Claims, 13 Drawing Sheets

F I G. 1
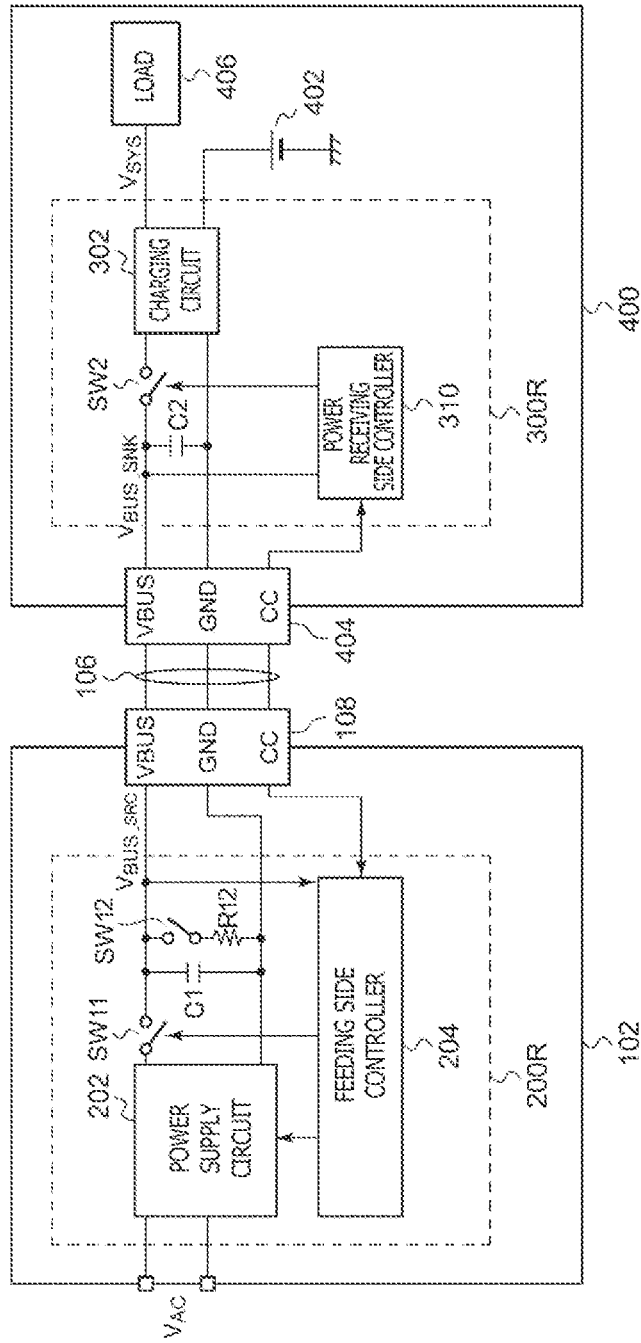
PRIOR ART

UNIVERSAL SERIAL BUS PORT CONTROLLER AND ELECTRONIC APPARATUS

CROSS REFERENCE TO RELATED APPLICATIONS

This application claims priority benefit of Japanese Patent Application No. JP 2021-130922 filed in the Japan Patent Office on Aug. 10, 2021. Each of the above-referenced applications is hereby incorporated herein by reference in its entirety.

BACKGROUND

The present disclosure relates to a controller for universal serial bus (USB) Type-C.

Battery driven devices including smart phones, tablet terminals, notebook computers, portable audio players, and digital cameras include, together with a rechargeable secondary battery, a charging circuit for charging the secondary battery. Some charging circuits charge a secondary battery on the basis of a direct current (DC) voltage (bus voltage $V_{BUS}$) externally supplied via a USB cable or a DC voltage from an external alternating current (AC) adapter.

A standard referred to as USB Power Delivery (which standard will hereinafter be referred to as a USB-PD standard) has been developed as a feeding system using USB. In the USB-PD standard, suppliable power is greatly increased from 7.5 W of a battery charging (BC) standard to a maximum of 100 W. Specifically, the USB-PD standard allows the supply of a voltage higher than 5 V (specifically, 9, 12, 15, or 20 V, for example) as a USB bus voltage, and allows the supply of a larger amount as a charging current (specifically, 2, 3, or 5 A, for example) than in the BC standard. The USB-PD standard is adopted also in a USB Type-C standard.

FIG. 1 is a block diagram of a feeding system 100R. This feeding system 100R is compliant with the USB Type-C standard. The feeding system 100R includes a feeding device (referred to also as a source or a host) 200R and a power receiving device (referred to also as a sink or a device) 300R connected to each other via a USB cable 106.

The feeding device 200R is included in an electronic apparatus 102. The electronic apparatus 102 may be an AC adapter. The power receiving device 300R is included in a battery driven electronic apparatus 400 such as a smart phone, a tablet terminal, a digital camera, a digital video camera, or a portable audio player.

The feeding device 200R includes a power supply circuit 202, a PD controller on a feeding side (which will hereinafter be referred to as a feeding side controller) 204, a bus switch SW11, a discharge switch SW12, and a discharge resistance R12. The USB cable 106 is detachably connected to a receptacle 108 of the electronic apparatus 400. Incidentally, in a case where the electronic apparatus 400 is a charge adapter, the receptacle 108 is omitted, and the USB cable 106 is integral with a main body of the charge adapter.

The receptacle 108 includes a VBUS terminal for supplying a bus voltage $V_{BUS}$, a GND terminal for supplying a ground voltage $V_{GND}$, and a configuration channel (CC) port. In practice, two CC ports are provided. However, the CC ports are depicted in a simplified manner as one CC port in FIG. 1. The power supply circuit 202 generates the bus voltage $V_{BUS}$. The power supply circuit 202 may include an AC/DC converter that receives AC 100 V from an external power supply (for example, a commercial alternating-current power supply) not depicted, and converts AC 100 V into a direct-current bus voltage $V_{BUS}$. The bus voltage $V_{BUS}$ generated by the power supply circuit 202 is supplied to the power receiving device 300R via the bus switch SW11 and the USB cable 106.

The feeding side controller 204 and a power receiving side controller 310 are each a port controller for USB Type-C. The feeding side controller 204 and the power receiving side controller 310 are connected to each other via a CC line, and provide a communicating function. The feeding side controller 204 and the power receiving side controller 310 negotiate the voltage level of the bus voltage $V_{BUS}$ to be supplied by the feeding device 200R. The feeding side controller 204 controls the power supply circuit 202 in a manner providing the determined voltage level, and performs on-off control of the bus switch SW11.

The discharge switch SW12 and the discharge resistance R12 are connected in parallel with a capacitor C1. When the electronic apparatus 102 and the electronic apparatus 400 are disconnected from each other, the feeding side controller 204 turns off the bus switch SW11, and turns on the discharge switch SW12. Consequently, the capacitor C1 is discharged, and the output voltage $V_{BUS\_SRC}$ of the feeding device 200R decreases to 0 V.

The electronic apparatus 400 includes a battery 402, a receptacle 404, a load (system) circuit 406, and the power receiving device 300R. The battery 402 is a rechargeable secondary battery. The load circuit 406 includes a CPU, a memory, a liquid crystal display, an audio circuit, and other components. The electronic apparatus 102 is detachably connected to the receptacle 404 via the USB cable 106.

The power receiving device 300R receives power from the electronic apparatus 102, and charges a charging circuit 302. The power receiving device 300R includes the charging circuit 302, the power receiving side controller 310, and a bus switch SW2.

The charging circuit 302 receives the bus voltage $V_{BUS}$ from the feeding device 200R (on the power receiving device 300R side, the bus voltage $V_{BUS}$ will be described as the bus voltage $V_{BUS\_SNK}$) via the USB cable 106 and the bus switch SW2, and charges the battery 402. The charging circuit 302 is constituted by a step-down DC/DC converter, a linear regulator, or a combination thereof.

A system voltage $V_{SYS}$ corresponding to at least one of the bus voltage $V_{BUS\_SNK}$ and a voltage $V_{BAT}$ of the battery 402 is supplied from the charging circuit 302 to the load circuit 406. The load circuit 406 includes a multi-channel power supply including a power management integrated circuit (IC), a DC/DC converter, a linear regulator, and other components, a microcomputer, a liquid crystal display, a display driver, and other components.

Data (PDO: Power Data Object) that defines the bus voltage $V_{BUS}$ requested by the power receiving device 300R and a maximum current is defined in the power receiving side controller 310. When the electronic apparatus 102 and the electronic apparatus 400 are connected to each other, the feeding side controller 204 and the power receiving side controller 310 perform negotiation, and determine the voltage level of the bus voltage $V_{BUS}$ on the basis of the PDO. In addition, the power receiving side controller 310 performs on-off control of the bus switch SW2.

FIG. 2 is an operation sequence diagram of the feeding system 100R in FIG. 1. When the feeding device 200R and the power receiving device 300R are connected to each other via the USB cable 106, the feeding side controller 204 detects the connection on the basis of the state of the CC port (S100). Specifically, the power receiving side controller 310 of the power receiving device 300R waits in a state in which the CC port is pulled down by a pull-down resistance (terminating resistance) Rd having a predetermined resistance value. When the feeding device 200R and the power receiving device 300R are connected to each other, a voltage corresponding to the pull-down resistance Rd on the power receiving device 300R side and the state of the feeding device 200R itself occurs at the CC port of the feeding device 200R. The feeding side controller 204 of the feeding device 200R can thus detect the connection of the power receiving device 300R (electronic apparatus 400).

Detecting the connection of the power receiving device 300R, the feeding device 200R turns on the bus switch SW11 (S102) and supplies a default bus voltage $V_{BUS}$ of 5 V on condition that the voltage of the $V_{BUS}$ terminal of the feeding device 200R itself is lower than a voltage level referred to as vSafe0V. The power receiving side controller 310 becomes operable when the bus switch SW11 is turned on. In the standard, vSafe0V is defined between 0.0 and 0.8 V.

Next, the feeding side controller 204 and the power receiving side controller 310 perform negotiation, and determine the bus voltage $V_{BUS}$ (S104). The feeding side controller 204 changes the bus voltage $V_{BUS}$ from the initial voltage of 5 V to the requested voltage (S106).

When the changing of the bus voltage $V_{BUS}$ to the requested voltage is completed, the completion is notified from the feeding side controller 204 to the power receiving side controller 310 (S108). In response to this notification, the power receiving side controller 310 turns on the bus switch SW2 (S110). The bus voltage $V_{BUS}$ is thereby supplied to the charging circuit 302 and the load circuit 406 (S112).

An example of the related art is disclosed in Japanese Patent No. 6838879.

SUMMARY

The present inventor has investigated disconnection between the source and the sink of USB Type-C, and has identified the following problems.

As described above, when the electronic apparatus 102 and the electronic apparatus 400 are disconnected from each other, the feeding side controller 204 discharges the capacitor C1 and decreases the output voltage $V_{BUS\_SRC}$ by turning off the bus switch SW11 and turning on the discharge switch SW12.

However, when the bus switch SW11 cannot be turned off or a voltage is externally applied to the VBUS terminal of the receptacle 108, the output voltage $V_{BUS\_SRC}$ does not decrease to 0 V, and a current continues flowing through the discharge switch SW12 and the discharge resistance R12.

The present disclosure has been made in view of such problems. As a certain example of the present disclosure, it is desirable to provide a port controller that can detect an abnormality in a source that may occur after the source and a sink are disconnected from each other.

A certain example of the present disclosure relates to a USB port controller on a source side, the USB port controller being compatible with USB Type-C. A source equipped with the USB port controller includes a power supply terminal, a power supply circuit, a switch connected between an output of the power supply circuit and the power supply terminal, a capacitor connected to the power supply terminal, and a discharge resistance and a discharge switch connected in series with each other between the power supply terminal and a ground line. The USB port controller includes an abnormality detector which detects an output voltage of the power supply terminal a plurality of times after the discharge switch is turned on and detects an abnormality on the basis of a temporal change in the output voltage.

Another example of the present disclosure is an electronic apparatus. This electronic apparatus includes a USB receptacle including a power supply terminal and a grounding terminal, a power supply circuit, a switch connected between an output of the power supply circuit and the power supply terminal, a capacitor connected to the power supply terminal, a discharge resistance and a discharge switch connected in series with each other between the power supply terminal and a ground line, and an abnormality detector which detects an output voltage of the power supply terminal a plurality of times after the discharge switch is turned on and detects an abnormality on the basis of a temporal change in the output voltage.

According to a certain example of the present disclosure, it is possible to detect an abnormality in which a current continues flowing through a discharge path after the source and the sink are disconnected from each other.

BRIEF DESCRIPTION OF THE DRAWINGS

FIG. 1 is a block diagram of a feeding system;

DETAILED DESCRIPTION OF THE PREFERRED EMBODIMENTS

Outline of Embodiments

Figure 2:
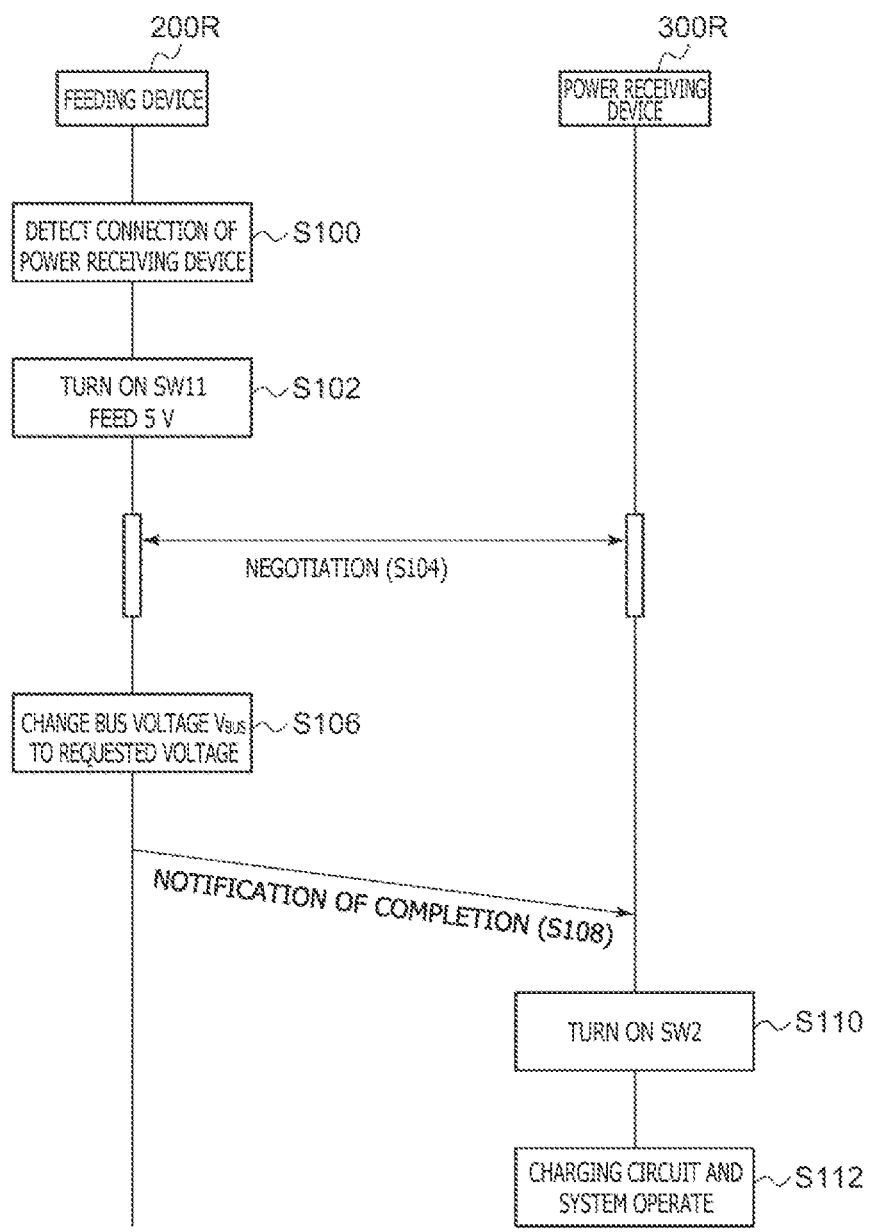
FIG. 2 is an operation sequence diagram of the feeding system of FIG. 1.

An outline of a few illustrative embodiments of the present disclosure will be described. This outline describes, in a simplified manner, a few concepts of one or a plurality of embodiments as an introduction to the following detailed description for a purpose of basic understanding of the embodiments, and does not limit the scope of the invention or the disclosure. This outline is neither a comprehensive outline of all conceivable embodiments nor one intended to identify important elements of all of the embodiments or to demarcate the scope of a part or all of examples. For convenience, "one embodiment" may be used to refer to one embodiment (an example or a modification) or a plurality of embodiments (examples or modifications) disclosed in the present specification.

One embodiment relates to a USB port controller on a source side, the USB port controller being compatible with USB Type-C. A source equipped with the USB port controller includes a power supply terminal, a power supply circuit, a switch connected between an output of the power supply circuit and the power supply terminal, a capacitor connected to the power supply terminal, and a discharge resistance and a discharge switch connected in series with each other between the power supply terminal and a ground line. The USB port controller includes an abnormality detector that detects an output voltage of the power supply terminal a plurality of times after the discharge switch is turned on and detects an abnormality on the basis of a temporal change in the output voltage.

When the circuit is normal, the output voltage occurring at the power supply terminal decreases with time as the discharge of the capacitor progresses, and the power consumption of the discharge resistance also decreases with time. Accordingly, an abnormality can be detected in a short period of time by monitoring a temporal change in the output voltage and determining whether the output voltage or the power consumption is decreasing as expected.

In one embodiment, a threshold voltage may be determined in a manner corresponding to an elapsed time from the turning on of the discharge switch. The abnormality detector may determine an abnormality when the output voltage detected at each time exceeds the corresponding threshold voltage.

In one embodiment, the abnormality detector may calculate power on the basis of the output voltage detected at each time, and determine an abnormality when a value obtained by integrating the power at each time exceeds a predetermined threshold value.

In one embodiment, the discharge switch may be included in the USB port controller.

In one embodiment, the discharge resistance may be included in the USB port controller.

In one embodiment, the USB port controller may be integrated on one semiconductor substrate. "Integrated" includes a case where all of circuit constituent elements are formed on the semiconductor substrate and a case where main circuit constituent elements are integrated. Some of resistances, capacitors, and other components may be provided outside the semiconductor substrate for adjustment of circuit constants. Integrating the circuit on one chip can reduce a circuit area, and hold characteristics of the circuit elements uniform.

An electronic apparatus according to one embodiment includes a USB receptacle including a power supply terminal and a grounding terminal, a power supply circuit, a switch connected between an output of the power supply circuit and the power supply terminal, a capacitor connected to the power supply terminal, a discharge resistance and a discharge switch connected in series with each other between the power supply terminal and a ground line, and an abnormality detector which detects an output voltage of the power supply terminal a plurality of times after the discharge switch is turned on, and which detects an abnormality on the basis of a temporal change in the output voltage.

When the circuit is normal, the output voltage occurring at the power supply terminal decreases with time as the discharge of the capacitor progresses, and the power consumption of the discharge resistance also decreases with time. Accordingly, an abnormality can be detected by monitoring a temporal change in the output voltage and determining whether the output voltage or the power consumption is decreasing as expected.

In one embodiment, a threshold voltage may be determined in a manner corresponding to an elapsed time from the turning on of the discharge switch. The abnormality detector may determine an abnormality when the output voltage detected at each time exceeds the corresponding threshold voltage.

In one embodiment, the abnormality detector may calculate power on the basis of the output voltage detected at each time, and determine an abnormality when a value obtained by integrating the power at each time exceeds a predetermined threshold value.

EMBODIMENT

A preferred embodiment will hereinafter be described with reference to the drawings. Identical or equivalent constituent elements, members, and processing depicted in each drawing are identified by the same reference signs, and repeated description thereof will be omitted as appropriate. In addition, the embodiment is not restrictive of the disclosure and the invention and is illustrative, and all features described in the embodiment and combinations thereof are not necessarily essential to the disclosure and the invention.

In the present specification, a "state in which a member A is connected to a member B" includes not only a case where the member A and the member B are physically directly connected to each other but also a case where the member A and the member B are indirectly connected to each other via another member that does not essentially affect a state of electric connection between the member A and the member B or does not impair functions or effects produced by the coupling of the member A and the member B.

Similarly, a "state in which a member C is connected (provided) between the member A and the member B" includes not only a case where the member A and the member C or the member B and the member C are directly connected to each other but also a case where the member A and the member C or the member B and the member C are indirectly connected to each other via another member that does not essentially affect a state of electric connection between the member A and the member C or the member B and the member C or does not impair functions or effects produced by the coupling of the member A and the member C or the member B and the member C.

Figure 3:
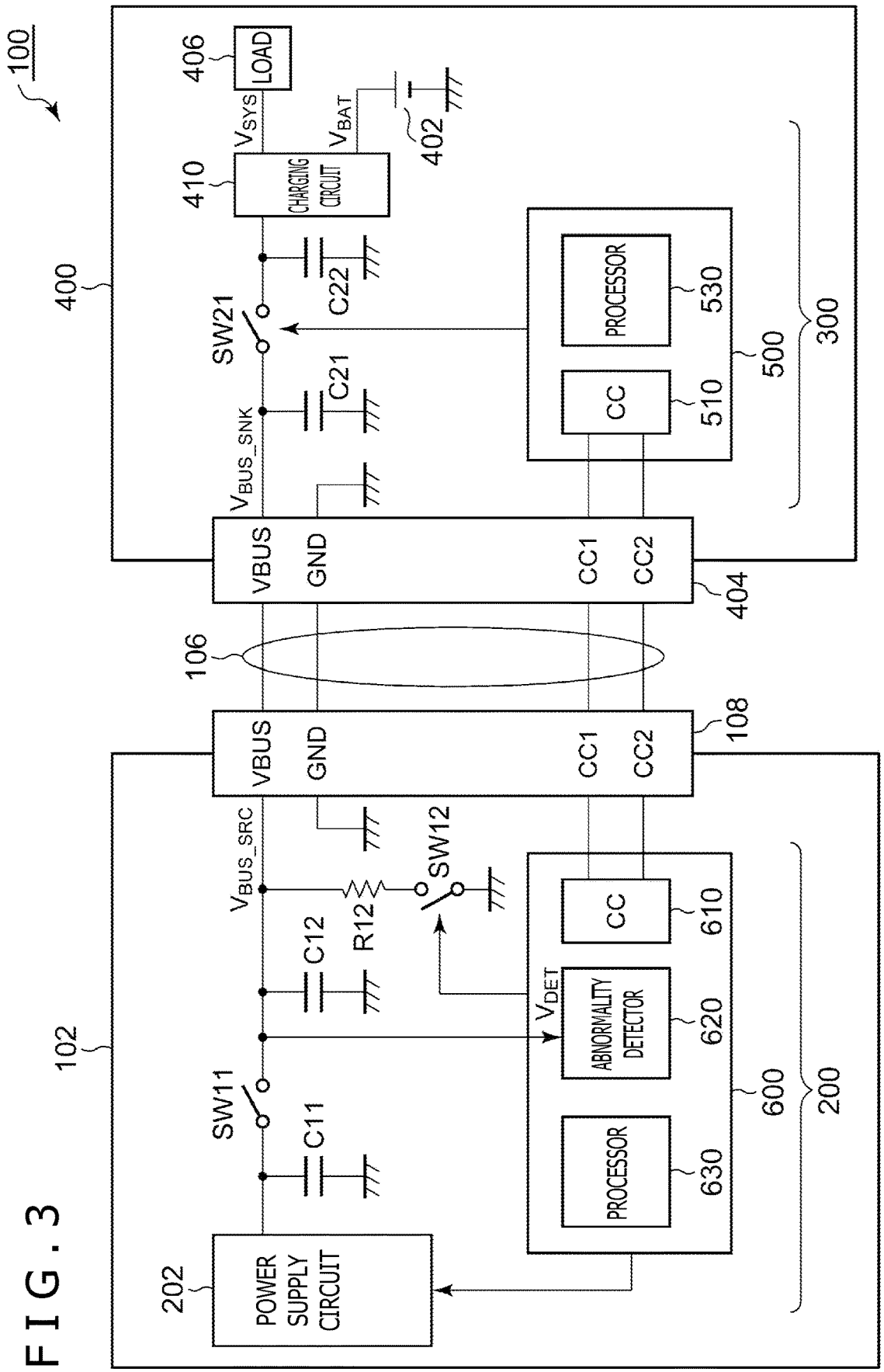
FIG. 3 is a block diagram of a feeding system according to an embodiment.

FIG. 3 is a block diagram of a feeding system 100 according to an embodiment. The feeding system 100 is compliant with the USB Type-C standard. The feeding system 100 includes a feeding device (referred to also as a source) 200 and a power receiving device (referred to also as a sink) 300. The feeding device 200 and the power receiving device 300 are connected to each other via a USB cable 106.

The feeding device 200 is, for example, included in an electronic apparatus 102. The electronic apparatus 102 may be an AC adapter. The power receiving device 300 is included in a battery driven type electronic apparatus 400 such as a smart phone, a tablet terminal, a digital camera, a digital video camera, or a portable audio player.

A configuration of the source side, that is, the electronic apparatus 102 side, will first be described.

The electronic apparatus 102 includes the feeding device 200 and a receptacle 108. The feeding device 200 includes a power supply circuit 202, a USB port controller 600 on a feeding side, a bus switch SW11, a discharge switch SW12, a discharge resistance R12, and capacitors C11 and C12. The USB cable 106 is detachably connected to the receptacle 108 of the electronic apparatus 400. Incidentally, there is also a charge adapter in which the receptacle 108 is omitted and the USB cable 106 is integral with the electronic apparatus 102.

The receptacle 108 includes a VBUS terminal for supplying a bus voltage $V_{BUS}$, a GND terminal for supplying a ground voltage $V_{GND}$ (0 V), and configuration channel (CC) ports.

The power supply circuit 202 generates the bus voltage $V_{BUS}$. The power supply circuit 202 may include an AC/DC converter which receives AC 100 V from an external power supply (for example, a commercial alternating-current power supply) not depicted and converts AC 100 V into a direct-current bus voltage $V_{BUS}$. The bus voltage $V_{BUS}$ generated by the power supply circuit 202 is supplied to the power receiving device 300 via a bus line of the USB cable 106 and the bus switch SW11.

The USB port controller 600 is a port controller for USB Type-C and USB-PD. The USB port controller 600 and a USB port controller 500 are connected to each other via CC lines.

The USB port controller 600 includes a CC pin circuit 610, an abnormality detector 620, and a processor 630.

The CC pin circuit 610 includes a pull-up resistance that pulls up CC pins. It is declared by this pull-up resistance that the feeding device 200 is the source. In a case where the feeding device 200 has a dual power role (DPR) that allows switching between the sink and the source, the CC pin circuit 610 is configured to be switchable between a state in which the CC pins are pulled down (that is, the sink) and a state in which the CC pins are pulled up (that is, the source).

The CC pin circuit 610 includes a comparator that compares the voltages of the CC pins with a threshold voltage, or other component. It is detected on the basis of an output of this comparator that the power receiving device 300 is connected to the feeding device 200 via the USB cable 106.

In addition, the USB port controller 500 and the USB port controller 600 can communicate with each other via the CC lines. A transceiver for communication is included in the CC pin circuit 610.

The USB port controller 600 and the USB port controller 500 negotiate the voltage level of the bus voltage $V_{BUS}$ to be supplied by the feeding device 200. The USB port controller 600 controls the power supply circuit 202 in a manner providing the determined voltage level, and performs on-off control of the bus switch SW11. The processor 630 executes a software program, and thereby performs negotiation with the USB port controller 500. The processor 630 may be a microcontroller independent of the USB port controller 600.

After the USB port controller 600 detects the connection of the power receiving device 300 to the feeding device 200, the USB port controller 600 turns on the bus switch SW11 on condition that the bus voltage (output voltage) $V_{BUS\_SRC}$ of the VBUS terminal is lower than a predetermined threshold value vSafe0V.

In addition, the USB port controller 600 turns off the bus switch SW11 when the feeding device 200 and the power receiving device 300 are disconnected from each other. In addition, the USB port controller 600 turns on the discharge switch SW12 to decrease the output voltage $V_{BUS\_SRC}$ to 0 V. The output voltage $V_{BUS\_SRC}$ thereby becomes lower than the threshold value vSafe0V.

The abnormality detector 620 monitors the output voltage $V_{BUS\_SRC}$ of the VBUS terminal. The abnormality detector 620 detects the output voltage $V_{BUS\_SRC}$ of the VBUS terminal a plurality of times after the USB port controller 600 turns on the discharge switch SW. Then, the abnormality detector 620 detects an abnormality on the basis of a temporal change in the output voltage $V_{BUS\_SRC}$.

When the abnormality detector 620 detects an abnormality, the USB port controller 600 turns off the discharge switch SW12, and thereby interrupts a discharge path.

Figure 4:
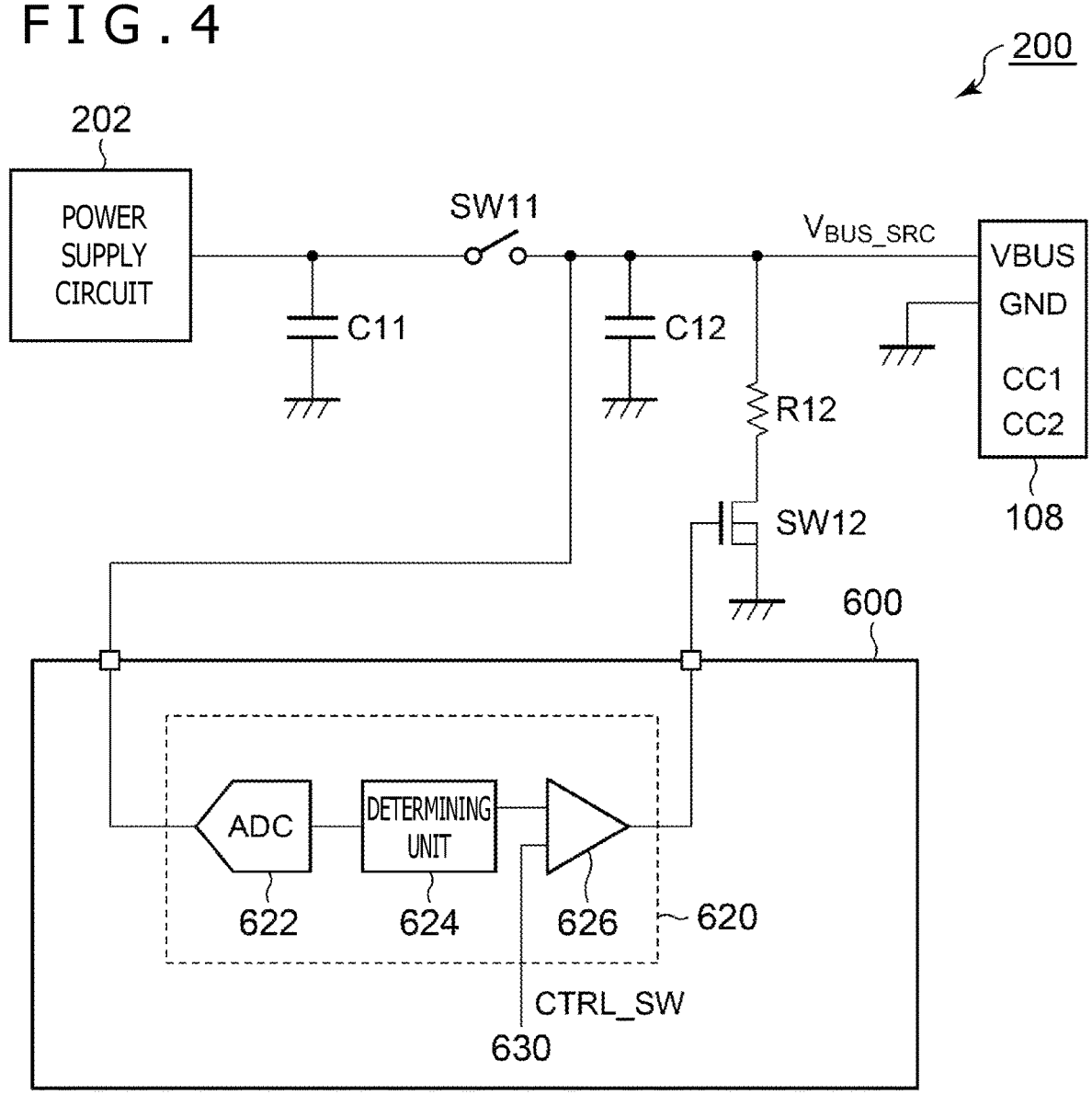
FIG. 4 is a circuit diagram depicting an example of a configuration of a USB port controller.

FIG. 4 is a circuit diagram depicting an example of a configuration of the USB port controller 600. The discharge switch SW12 is constituted by an N-channel metal-oxide semiconductor field effect transistor (MOSFET). FIG. 4 depicts only the abnormality detector 620 in the USB port controller 600.

The abnormality detector 620 includes an A/D converter 622, a determining unit 624, and a driver 626.

The A/D converter 622 converts the output voltage $V_{BUS\_SRC}$ into a digital value. The abnormality detector 620 detects an abnormality by digital signal processing. In this case, a part or all of functions of the abnormality detector 620 may be implemented in the processor 630. A result of determination by the determining unit 624 is input to the driver 626.

The driver 626 drives the discharge switch SW12 according to a control signal CTRL_SW from the processor 630. When the determining unit 624 detects an abnormality, the driver 626 turns off the discharge switch SW12, irrespective of the control signal CTRL_SW.

An abnormality determining method (first abnormality detecting method) of the abnormality detector 620 in the present embodiment will be described. Threshold voltages (referred to also as a threshold voltage train) $V_{TH1}$, $V_{TH2}$, ... $V_{THn}$ which decrease according to elapsed times $t_1, t_2, \ldots t_n$ from the turning on of the discharge switch SW12 are determined.

When the capacitor C12 whose initial voltage is $v_0$ is discharged by the resistance having a resistance value R12, the voltage v(t) of the capacitor is expressed by an RC discharge equation as Equation (1). $v_0$ is an initial voltage at a time of a start of discharge.

$$v(t)=v_0\times\exp\{-t/(C12\cdot R12)\} \quad (1)$$

The threshold values $V_{TH1}$, $V_{TH2}$, ... may be determined according to Equation (1) of RC discharge.

The threshold voltage $V_{TH}(t)$ may, for example, be determined on the basis of Equation (2).

$$V_{TH}(t)=A\times v_0\times\exp\{-t/(C12\cdot R12)\}- \quad (2)$$

where A is a coefficient satisfying A>1.

Alternatively, the threshold voltage $V_{TH}(t)$ may be determined by Equation (3).

$$V_{TH}(t)=v_0\times\exp\{-t/(C12\cdot R12)\}+V_{merg} \quad (3)$$

where $V_{merg}$ is a predetermined voltage margin.

Alternatively, the threshold voltage $V_{TH}(t)$ may be determined by Equation (4).

$$V_{TH}(t)=A\times v_0\times\exp\{-t/(C12\cdot R12)\}+V_{merg} \quad (4)$$

The threshold voltage at each time is expressed as follows.

$V_{TH1} = V_{TH}(t_1)$
$V_{TH2} = V_{TH}(t_2)$
...
$V_{THn} = V_{TH}(t_n)$

The initial voltage $v_0$ at a time of a start of charge is equal to the voltage level of the bus voltage $V_{BUS\_SRC}$ during immediately preceding feeding. In USB-PD, the output voltage $V_{BUS\_SRC}$ of the feeding device 200 can assume various voltage levels according to negotiation. Accordingly, the voltage $v_0$ in Equations (1) to (4) can be determined according to a set value of the immediately preceding bus voltage. That is, the threshold voltage train $V_{TH1}$ to $V_{THn}$ is determined for each voltage level immediately previously supplied by the power supply circuit.

Figure 5:
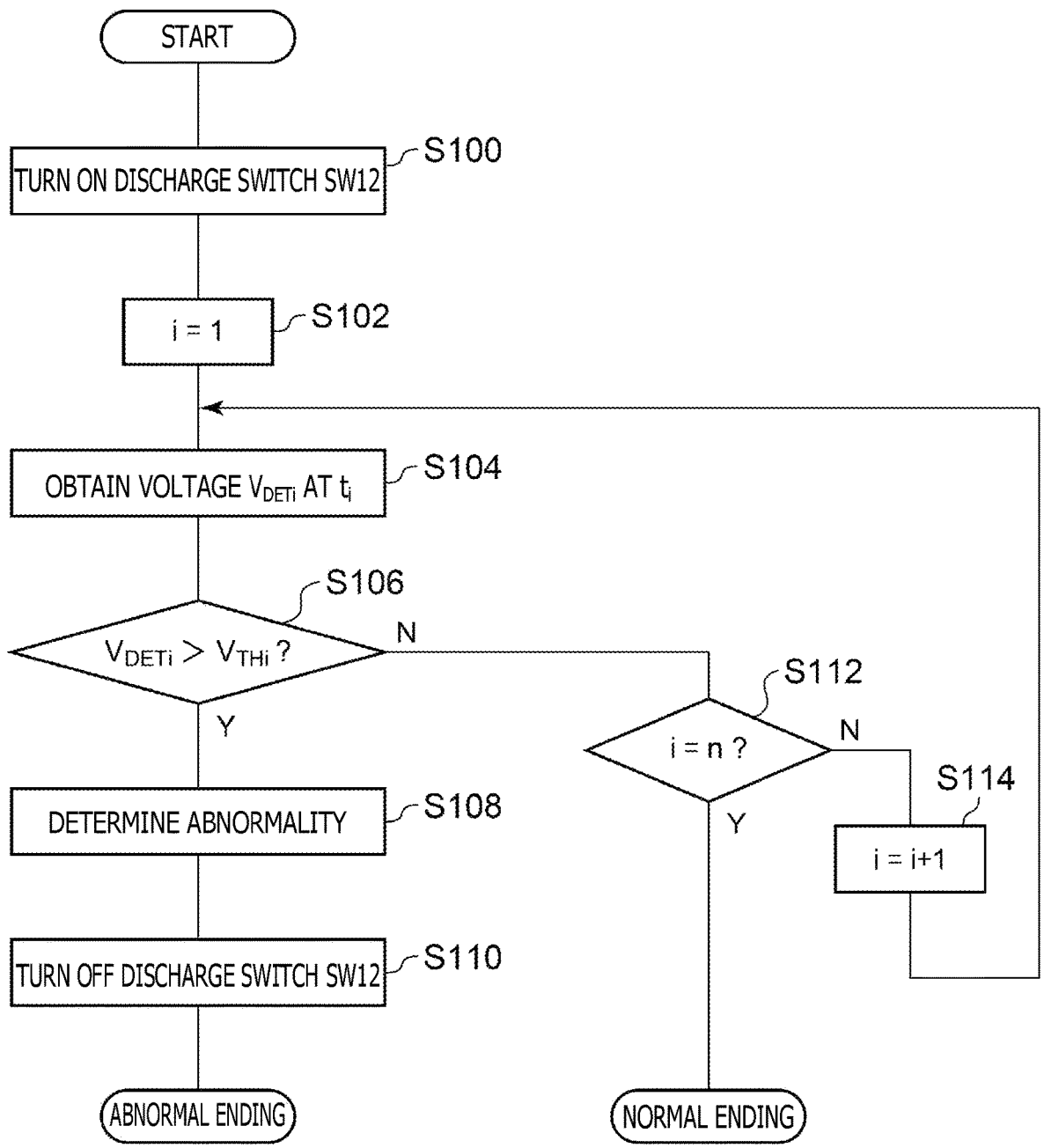
FIG. 5 is a flowchart of assistance in explaining a first abnormality detecting method.

FIG. 5 is a flowchart of assistance in explaining the first abnormality detecting method. First, the discharge switch SW12 is turned on, and discharge is thereby started (S100). The abnormality detector 620 sets i=1, and sets a first detection time $t_1$ (S102). Then, at each time $t_i$ (i=1, 2, ... n), the output voltage $V_{BUS\_SRCi}$ is detected, and thereby a voltage $V_{DETi}$ is obtained (S104). Then, the detected voltage $V_{DETi}$ is compared with the corresponding threshold voltage $V_{THi}$ (S106). An abnormality is determined (S108) when the detected voltage $V_{DETi}$ exceeds the threshold voltage $V_{THi}$ ($V_{DETi} > V_{THi}$) (Y in S106). When the abnormality is determined, the switch SW12 is turned off immediately (S106), and an abnormal ending is performed.

When the detected voltage $V_{DETi}$ is lower than the threshold voltage $V_{THi}$ ($V_{DETi} < V_{THi}$) in processing S106 (N in S106), normality is determined, and whether a final detection time has arrived is checked (S112). When the final detection time has arrived (i=n) (Y in S112), it is determined that the discharge is completed normally, and a normal ending is performed. When the final detection time has not arrived (i<n) (N in S112), i is incremented, and a wait is made until a next time $t_{i+1}$ (S114). Then, a return is made to processing S104.

The first abnormality determining method has been described above.

Returning to FIG. 3, description will be made of a configuration of the sink side, that is, the electronic apparatus 400.

The electronic apparatus 400 includes a battery 402, a receptacle 404, a load (system) circuit 406, and the power receiving device 300. The battery 402 is a rechargeable secondary battery. The load circuit 406 includes a CPU, a memory, a liquid crystal display, an audio circuit, and other components. The electronic apparatus 102 is detachably connected to the receptacle 404 via the USB cable 106.

The power receiving device 300 receives power from the electronic apparatus 102, and charges a charging circuit 410. The power receiving device 300 includes the charging circuit 302, the USB port controller 500, a bus switch SW21, and capacitors C21 and C22.

The charging circuit 410 receives the bus voltage $V_{BUS}$ from the feeding device 200 via the USB cable 106 and the bus switch SW21, and charges the battery 402. On the power receiving device 300 side, the bus voltage $V_{BUS}$ will be referred to also as an input voltage, and described as $V_{BUS\_SNK}$. The charging circuit 410 is constituted by a step-down DC/DC converter, a linear regulator, or a combination thereof.

A system voltage $V_{SYS}$ corresponding to at least one of the bus voltage $V_{BUS\_SNK}$ and a voltage $V_{BAT}$ of the battery 402 is supplied from the charging circuit 410 to the load circuit 406. The load circuit 406 includes a multi-channel power supply including a power management integrated circuit (IC), a DC/DC converter, a linear regulator, and other components, a microcomputer, a liquid crystal display, a display driver, and other components.

The capacitors C21 and C22 are connected to both ends of the bus switch SW21.

The USB port controller 500 includes a CC pin circuit 510 and a processor 530. The CC pin circuit 510 includes a pull-down resistance that pulls down the CC pins. Incidentally, in a case where the power receiving device 300 has a DPR that allows switching between the sink and the source, the CC pin circuit 510 is configured to be switchable between a state in which the CC pins are pulled down (that is, the sink) and a state in which the CC pins are pulled up (that is, the source).

As described above, the USB port controller 500 performs negotiation with the USB port controller 600 via the CC lines. A transceiver for communication via the CC lines is included in the CC pin circuit 510.

Data (PDO) that defines the bus voltage $V_{BUS}$ requested by the power receiving device 300 and a maximum current is defined in the USB port controller 500. When the electronic apparatus 102 and the electronic apparatus 400 are connected to each other, the USB port controller 600 and the USB port controller 500 perform negotiation, and determine the voltage level of the bus voltage $V_{BUS}$ on the basis of the PDO. In addition, the USB port controller 500 performs on-off control of the bus switch SW2. The processor 530 executes a software program, and thereby performs negotiation with the USB port controller 600. The processor 530 may be a microcontroller independent of the USB port controller 500.

A configuration of the feeding system 100 has been described above. Operating thereof will next be described.

Figure 6:
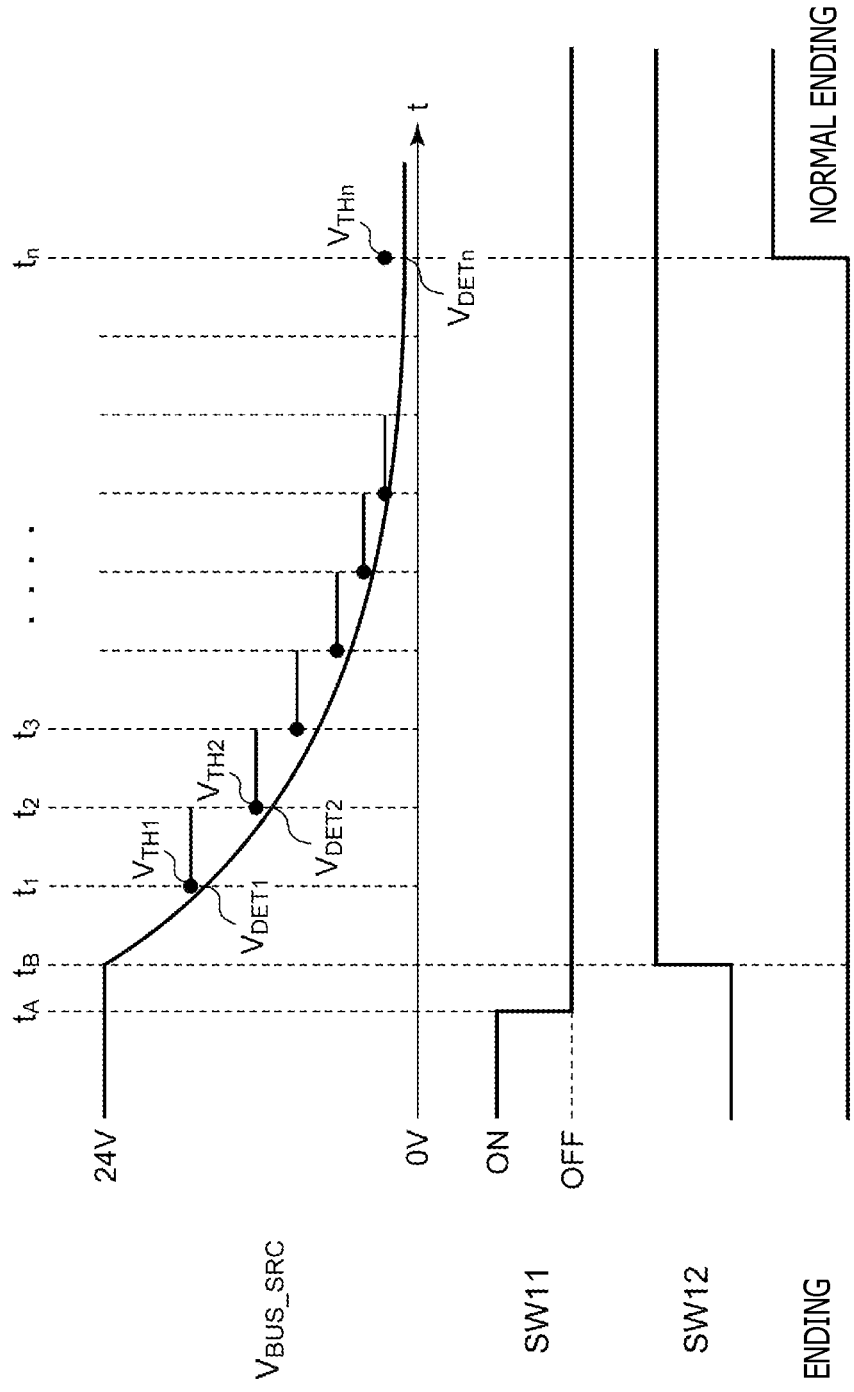
FIG. 6 is a diagram of assistance in explaining operation in a normal case after the disconnection of a feeding device and a power receiving device from each other in the feeding system of FIG. 3.

FIG. 6 is a diagram of assistance in explaining operation in a normal case after the disconnection of the feeding device 200 and the power receiving device 300 from each other in the feeding system 100 of FIG. 3.

Before time $t_A$, a bus voltage $V_{BUS\_SRC}$ of 24 V is supplied from the feeding device 200 to the power receiving device 300. When the cable is extracted at time $t_A$, and thereby the feeding device 200 and the power receiving device 300 are disconnected from each other, the bus switch SW11 is turned off. Then, at time $t_B$, the discharge switch SW12 is turned on, and thus discharge via the discharge resistance R12 is started. When the feeding device 200 is normal, the voltage $V_{BUS\_SRC}$ decreases with time after time $t_B$.

Thereafter, detected voltages $V_{DET1}, V_{DET2}, \ldots V_{DETn}$ are obtained at respective detection times $t_1, t_2, \ldots t_n$. The detection times may be at equal intervals (for example, 50 ms), or may be at unequal intervals. The detected voltage $V_{DETi}$ at each time is lower than the threshold voltage $V_{THi}$. Thus, progress is made to a final detection time $t_n$, and a normal ending is performed.

Figure 7:
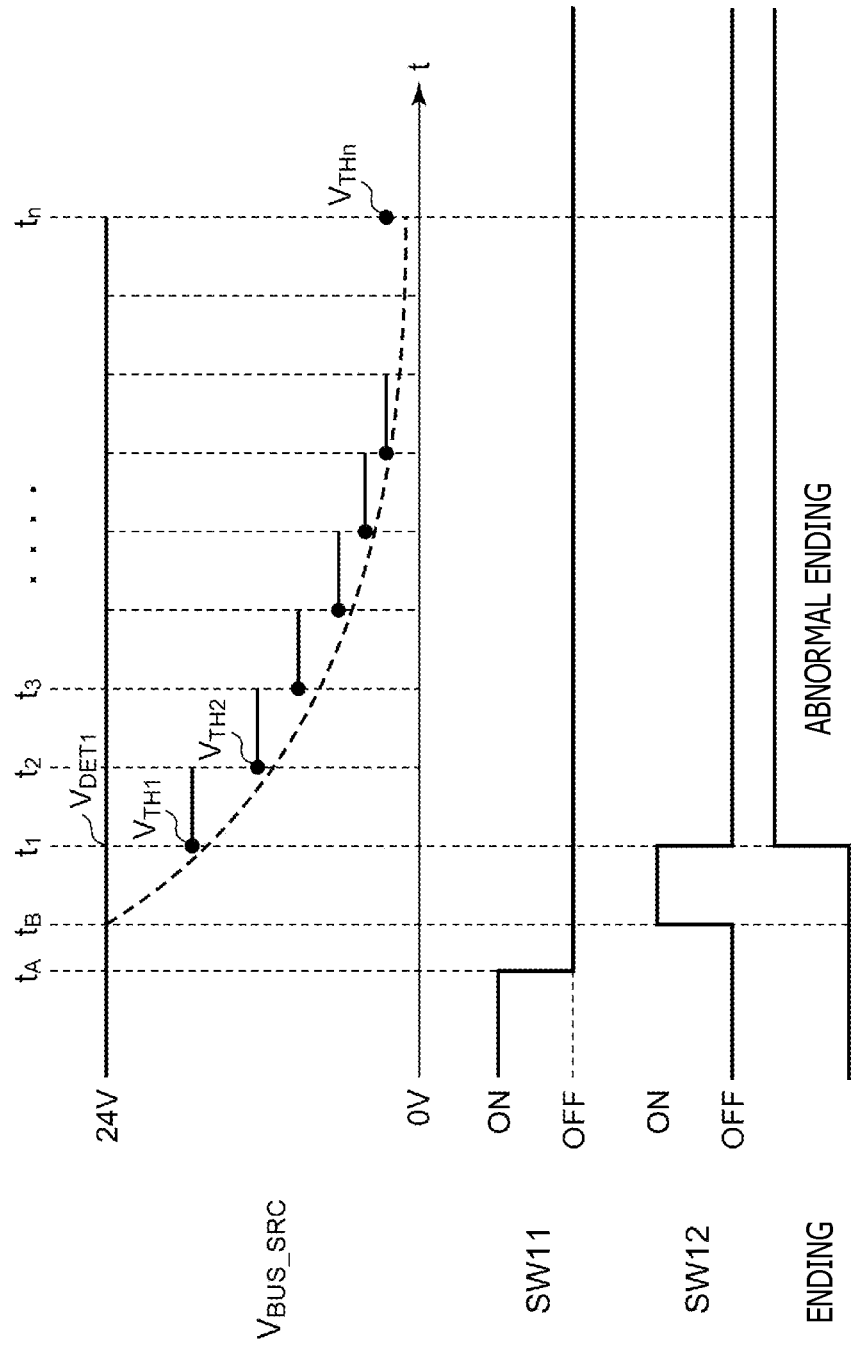
FIG. 7 is a diagram of assistance in explaining operation in an abnormal case after the disconnection of the feeding device and the power receiving device from each other in the feeding system of FIG. 3.

FIG. 7 is a diagram of assistance in explaining operation in an abnormal case after the disconnection of the feeding device 200 and the power receiving device 300 from each other in the feeding system 100 of FIG. 3. Here, suppose that an abnormality occurs in which the bus switch SW11 is not turned off. In this case, the output voltage $V_{BUS\_SRC}$ of the feeding device 200 continues to maintain the original voltage level of 24 V.

At this time, the voltage $V_{DET1}$ detected at time $t_1$ is 24 V. Thus, the voltage $V_{DET1}$ is higher than the threshold voltage $V_{TH1}$, so that an abnormality is determined. Then, the discharge switch SW12 is immediately turned off without waiting for a next time $t_2$, and an abnormal ending is performed.

Figure 8:
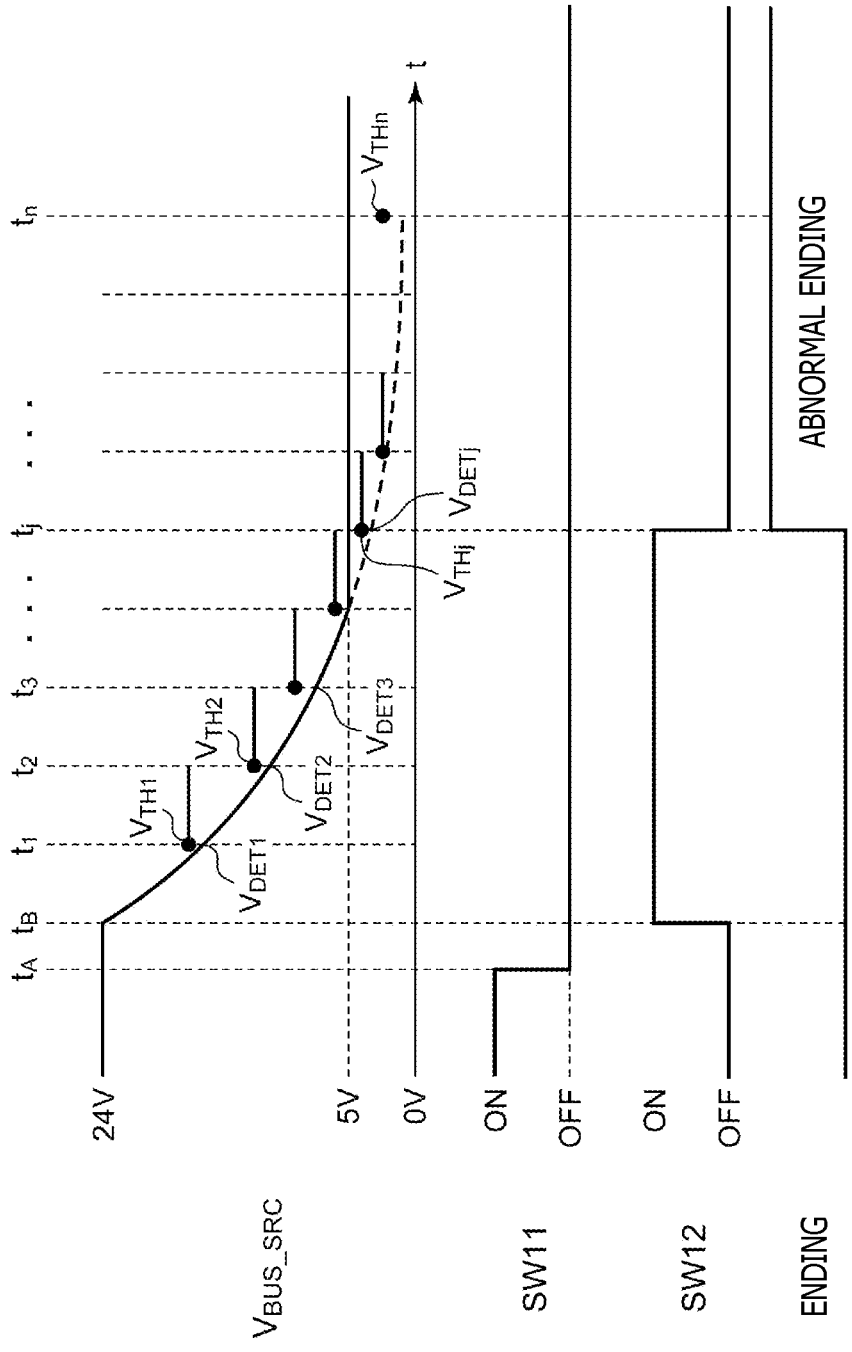
FIG. 8 is a diagram of assistance in explaining another operation in an abnormal case after the disconnection of the feeding device and the power receiving device from each other in the feeding system of FIG. 3.

FIG. 8 is a diagram of assistance in explaining another operation in an abnormal case after the disconnection of the feeding device 200 and the power receiving device 300 from each other in the feeding system 100 of FIG. 3. Here, examined will be an abnormality in which, after the feeding device 200 determines that the power receiving device 300 is disconnected, the power receiving device 300 is not disconnected in actuality, and the power receiving device 300 becomes a source and supplies a voltage of 5 V to the $V_{BUS}$ terminal of the feeding device 200.

In this case, the output voltage $V_{BUS\_SRC}$ of the feeding device 200 decreases from 24 V to 5 V, and thereafter maintains 5 V. At time $t_j$, the detected voltage $V_{DETj}$ is higher than the threshold voltage $V_{TH}$. Thus, an abnormality is determined, the discharge switch SW12 is turned off, and an abnormal ending is performed.

Operation of the feeding device 200 has been described above. Advantages of the feeding device 200 will be described.

When the circuit is normal, the output voltage $V_{BUS\_SRC}$ occurring at the $V_{BUS}$ terminal decreases with time as the discharge of the capacitor C12 progresses, and the power consumption of the discharge resistance R12 also decreases with time. Accordingly, an abnormality can be detected by monitoring a temporal change in the output voltage $V_{BUS\_SRC}$ and determining whether the output voltage or the power consumption is decreasing as expected.

Advantages of the present embodiment are clarified by comparison with a comparative technology. In the comparative technology, the output voltage $V_{BUS\_SRC}$ is compared with a threshold voltage $V_{TH}$ in the vicinity of 0 V (which threshold voltage may, for example, be vSafe0V set by the standard) only once after the passage of a sufficient time after the discharge switch SW12 is turned on (corresponding to the final detection time $t_n$ in the embodiment). An abnormality is determined when $V_{BUS\_SRC} > V_{TH}$.

Figure 9:
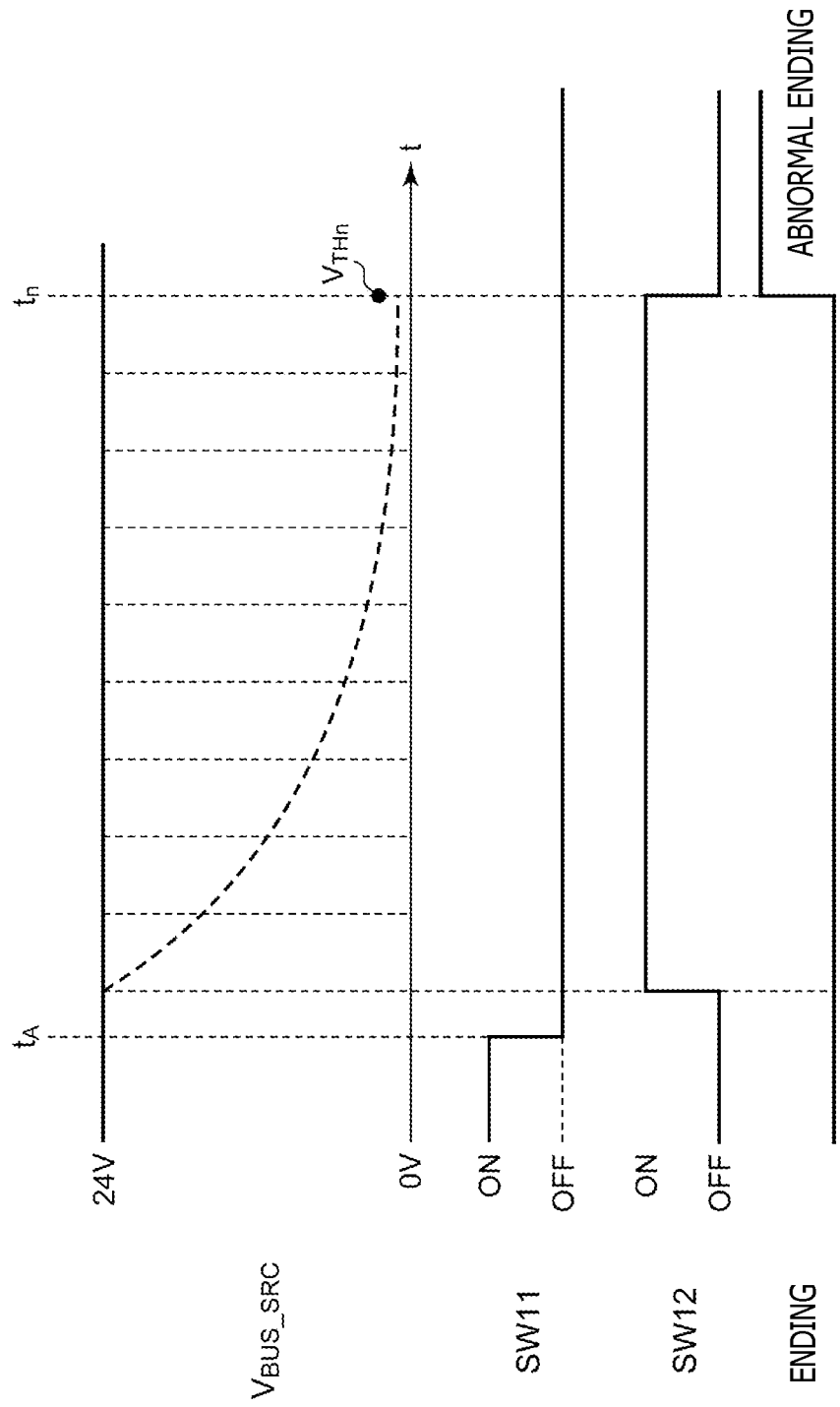
FIG. 9 is a diagram of assistance in explaining operation in an abnormal state in a comparative technology.

FIG. 9 is a diagram of assistance in explaining operation in an abnormal state in the comparative technology. Here, as in FIG. 7, suppose that there occurs an abnormality in which the bus switch SW11 is not turned off. In this case, the output voltage $V_{BUS\_SRC}$ of the feeding device 200 continues to maintain the original voltage level of 24 V.

In the comparative technology, the discharge switch SW12 continues to be on until a time corresponding to the final detection time $t_n$. When it is detected that the output voltage $V_{BUS\_SRC}$ is higher than the threshold voltage $V_{TH}$ at the final detection time $t_n$, an abnormality state is determined, the discharge switch SW12 is turned off, and an abnormal ending is performed.

In the comparative technology, a discharge current as a direct current continues to flow through the discharge resistance R12 over a long period $\Delta Tx$ of $t_A$ to $t_n$. In a case where a maximum value of the output voltage $V_{BUS}$ selectable in the feeding device 200 is $V_{MAX}$, the power consumption of the discharge resistance R12 is as follows.

$$P = V_{MAX}^2/R$$

Thus, a part whose rating is higher than this power consumption needs to be selected as the discharge resistance R12.

On the other hand, in the present embodiment, even in an abnormal state, the consumption of the power of $V_{MAX}^2/R$ is limited to a short interval $\Delta Ty$ of $t_B$ to $t_1$ in FIG. 7.

Figure 10:
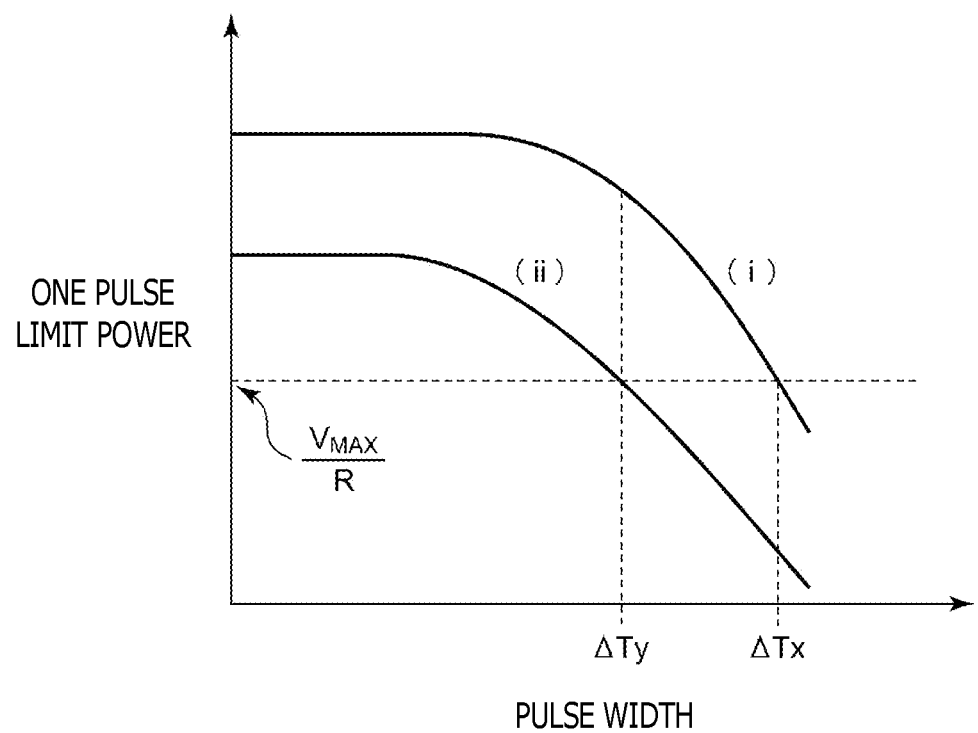
FIG. 10 is a diagram indicating pulse limit power.

There is a concept of one-pulse limit power (pulse limit power) for the rated power of a resistance. FIG. 10 is a diagram indicating the one-pulse limit power. An axis of abscissas indicates a pulse width, and an axis of ordinates indicates the one-pulse limit power. Ordinary rated power represents power that can be consumed continuously, whereas the one-pulse limit power represents power tolerated when a voltage in a pulse form is applied. The shorter the pulse width, the higher the one-pulse limit power.

FIG. 10 depicts the one-pulse limit power of two resistances of different rated powers. In the comparative technology, the power of $V_{MAX}^2/R$ is consumed for a period of a pulse width $\Delta Tx$. Hence, a part having a characteristic (i) needs to be selected.

On the other hand, in the present embodiment, the power of $V_{MAX}^2/R$ is consumed for a period of a pulse width $\Delta Ty$ ($<\Delta Tx$). Hence, it suffices to select a part having a characteristic (ii). That is, according to the present embodiment, it is possible to select a resistance part having a low rated power as compared with the comparative technology, and thus miniaturize the discharge resistance R12 or reduce the cost of the discharge resistance R12. An area of the discharge resistance R12 can be reduced in a case where the discharge resistance R12 is integrated in the USB port controller 600, as will be described later.

A second abnormality detecting method will next be described.

The abnormality detector 620 calculates power $P_i$ on the basis of the output voltage $V_{DETi}$ detected at each time $t_1$ (i=1, 2, ... n).

$$Pi = V_{DETi}^2/R$$

The abnormality detector 620 obtains total power $P_{TOTALi}$ by integrating power $P_1$ to $P_i$ calculated thus far at each time $t_i$.

$$P_{TOTALi} = P_{TOTALi-1} + Pi = \Sigma_{j=1:i} Pj$$

Then, an abnormality is determined when the integrated total power $P_{TOTALi}$ exceeds a predetermined threshold value $P_{TH}$. The threshold value $P_{TH}$ is determined according to the voltage level of the bus voltage $V_{BUS}$ during an immediately preceding feeding period.

Figure 11:
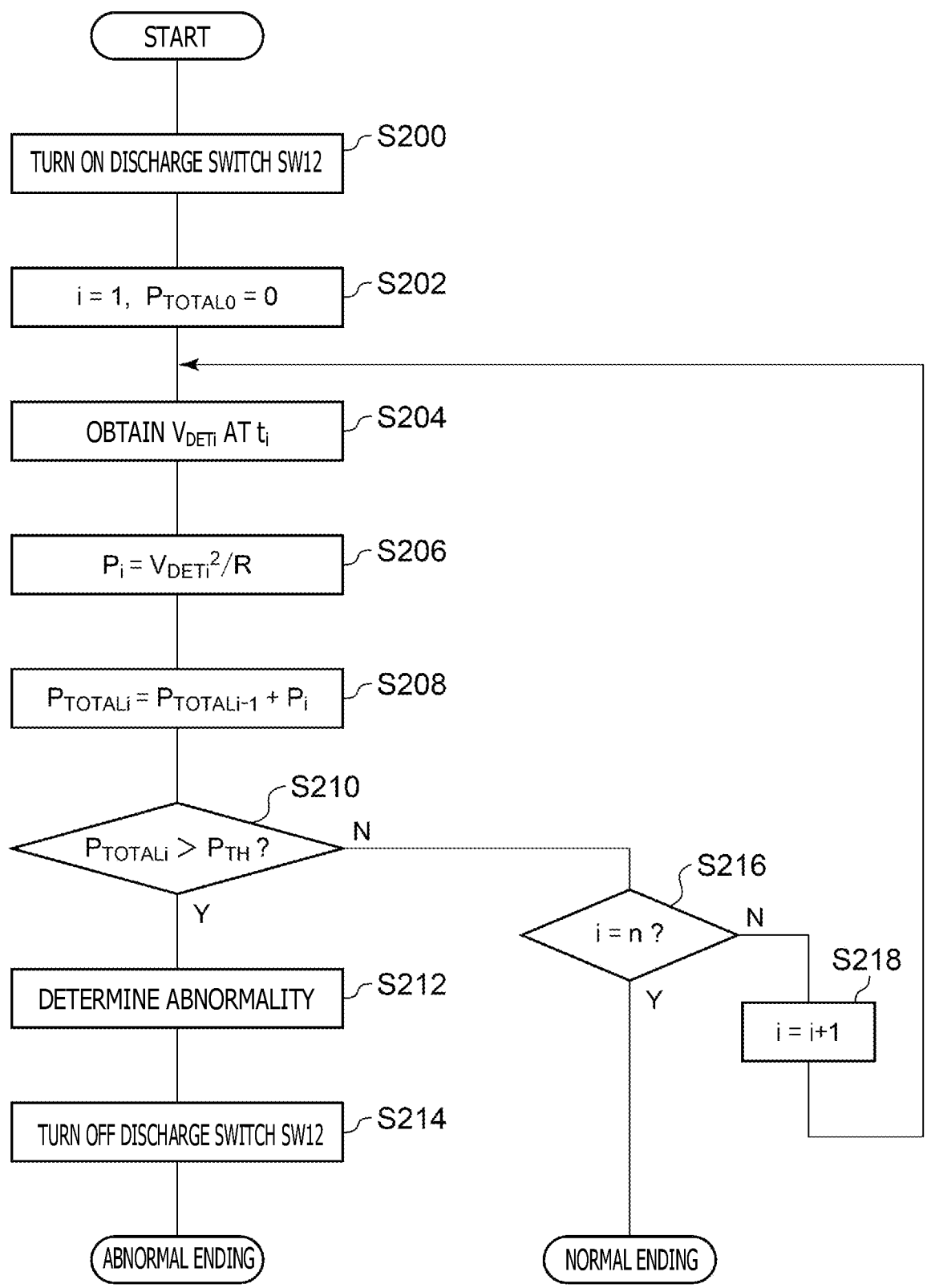
FIG. 11 is a flowchart of assistance in explaining a second abnormality detecting method.

FIG. 11 is a flowchart of assistance in explaining the second abnormality detecting method.

First, the discharge switch SW12 is turned on, and discharge is thereby started (S200). The abnormality detector 620 sets i=1, sets a first detection time $t_1$, and initializes total power $P_{TOTAL0}$ (S202).

Then, at each time $t_i$ (i=1, 2, ... n), the output voltage $V_{BUS\_SRCi}$ is detected, and thereby a voltage $V_{DETi}$ is obtained (S204). Then, power $P_i$ is calculated on the basis of the detected voltage $V_{DETi}$ (S206), the power $P_i$ is added to the total power $P_{TOTALi-1}$ up to a previous time, and the total power $P_{TOTALi}$ is thereby updated (S208).

Next, the abnormality detector 620 compares the total power $P_{TOTALi}$ with the threshold value $P_{TH}$ (S210). An abnormality is determined (S212) when $P_{TOTALi} > P_{TH}$ (Y in S210). When the abnormality is determined, the switch SW12 is turned off immediately (S214), and an abnormal ending is performed.

When $P_{TOTALi} < P_{TH}$ in processing S210 (N in S210), normality is determined, and whether the final detection time has arrived is checked (S216). When the final detection time has arrived (i=n) (Y in S216), it is determined that the discharge is completed normally, and a normal ending is performed. When the final detection time has not arrived (i<n) (N in S216), i is incremented, and a wait is made until a next time $t_{i+1}$ (S218). Then, a return is made to processing S204.

The second abnormality determining method has been described above.

The second abnormality detecting method can provide effects similar to those of the first abnormality detecting method.

(Modifications)

The foregoing embodiments are illustrative, and it is understood by those skilled in the art that combinations of constituent elements and processes of those embodiments are susceptible of various modifications. Such modifications will be described in the following.

(First Modification)

Figure 12:
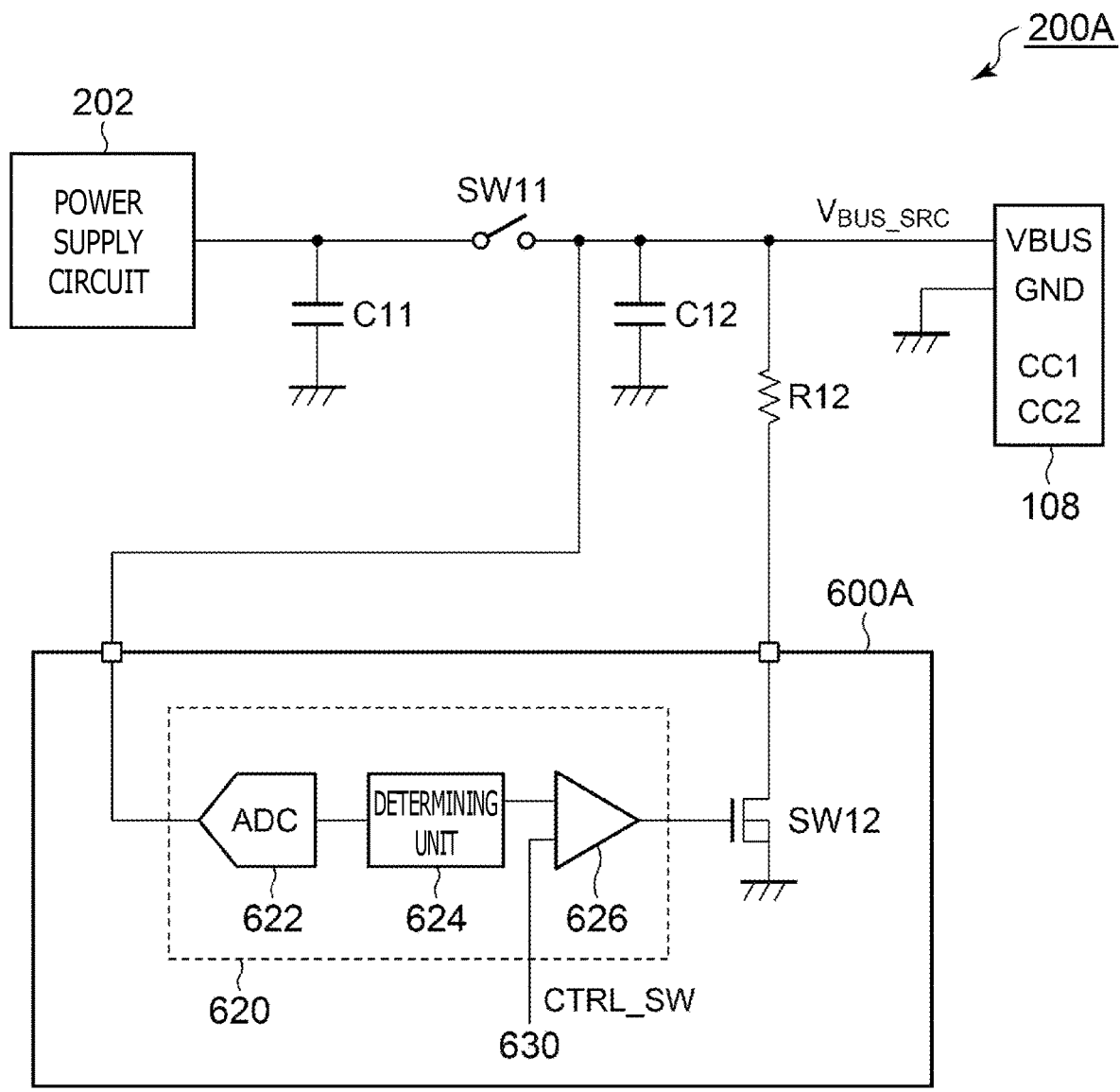
FIG. 12 is a circuit diagram of a feeding device according to a first modification.

FIG. 12 is a circuit diagram of a feeding device 200A according to a first modification. In this modification, the discharge switch SW12 is integrated in a USB port controller 600A. Others are similar to those of FIG. 3.

(Second Modification)

Figure 13:
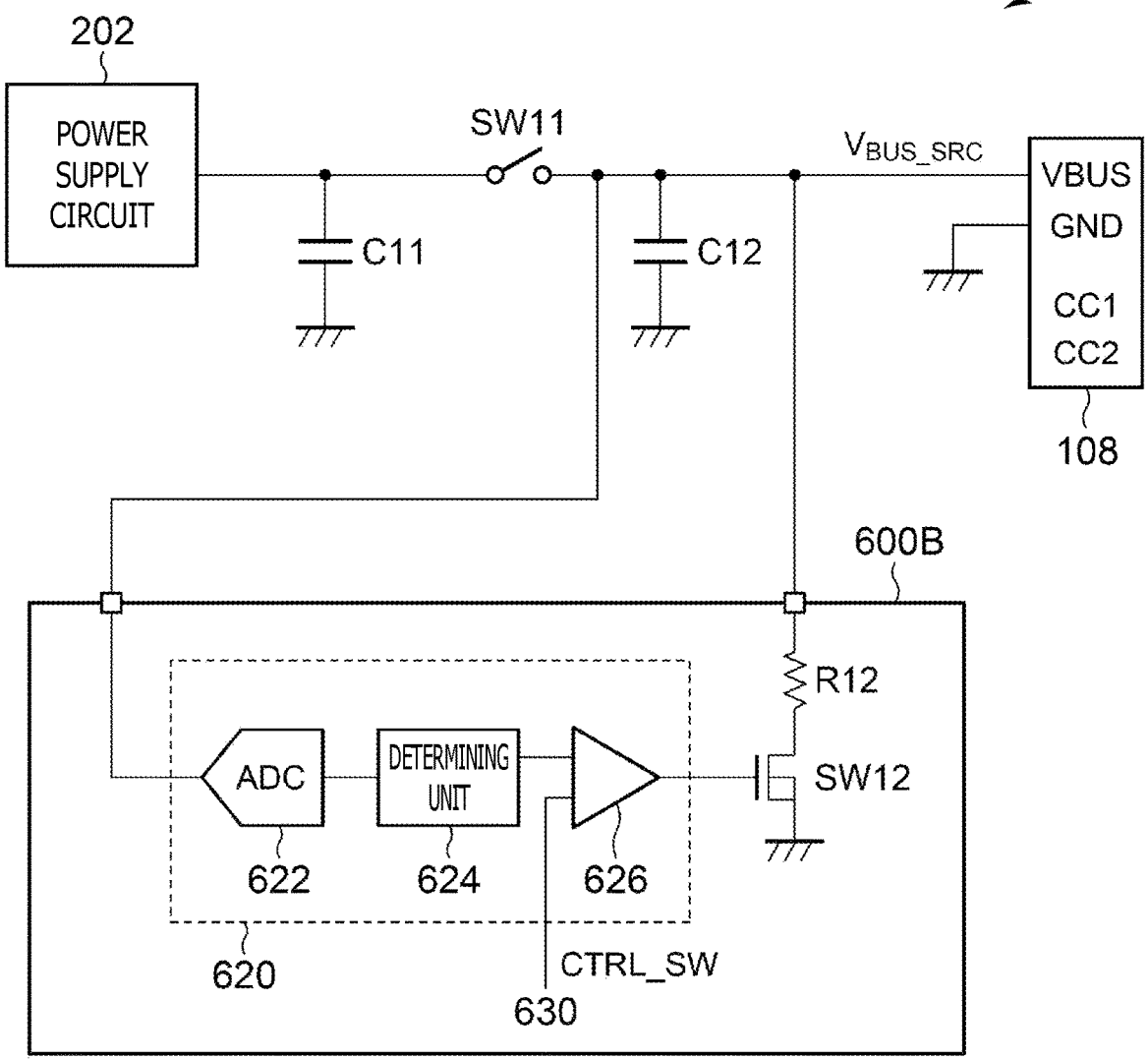
FIG. 13 is a circuit diagram of a feeding device according to a second modification.

FIG. 13 is a circuit diagram of a feeding device 200B according to a second modification. In this modification, the discharge switch SW12 and the discharge resistance R12 are integrated in a USB port controller 600B. In the comparative technology, the discharge resistance R12 needs to be designed in consideration of continuous rated power (or pulse limit power of a very long pulse), and therefore, when the discharge resistance R12 is to be integrated in the USB port controller 600, the area of the discharge resistance R12 is increased greatly.

On the other hand, in the present embodiment, the discharge resistance R12 can be designed on the basis of the pulse limit power of a very short pulse width rather than the continuous rated power. Therefore, when the discharge resistance R12 is to be integrated, the area of the discharge resistance R12 can be reduced.

The embodiments are illustrative, and it is to be understood by those skilled in the art that there are various modifications of combinations of constituent elements and processes of those embodiments and that such modifications are also included in the scope of the present disclosure or the present invention.

What is claimed is:

1. A universal serial bus port controller on a source side, the universal serial bus port controller being compatible with universal serial bus Type-C,
   a source equipped with the universal serial bus port controller including
      a power supply terminal,
      a power supply circuit,
      a switch connected between an output of the power supply circuit and the power supply terminal,
      a capacitor connected to the power supply terminal, and
      a discharge resistance and a discharge switch connected in series with each other between the power supply terminal and a ground line,
   the universal serial bus port controller comprising:
      an abnormality detector configured to:
         determine a threshold voltage that decreases according to an elapsed time from turn on of the discharge switch;
         detect an output voltage of the power supply terminal at a plurality of times after the turn on of the discharge switch; and
         detect, based on a temporal change in the output voltage, an abnormality when the output voltage detected at a time of the plurality of times exceeds the threshold voltage corresponding to the time.

2. The universal serial bus port controller according to claim 1, wherein the threshold voltage is determined for each voltage level immediately previously supplied by the power supply circuit.

3. The universal serial bus port controller according to claim 1, wherein the abnormality detector is further configured to calculate power based on the output voltage detected at each time, and determine the abnormality when a value obtained by integrating the power at each time exceeds a threshold value.

4. The universal serial bus port controller according to claim 3, wherein the threshold value is determined for each voltage level immediately previously supplied by the power supply circuit.

5. The universal serial bus port controller according to claim 1, wherein the discharge switch is included in the universal serial bus port controller.

6. The universal serial bus port controller according to claim 1, wherein the discharge resistance is included in the universal serial bus port controller.

7. The universal serial bus port controller according to claim 1, wherein the universal serial bus port controller is integrated on one semiconductor substrate.

8. An electronic apparatus comprising:
   the universal serial bus port controller according to claim 1.

9. An electronic apparatus, comprising:
   a universal serial bus receptacle including a power supply terminal and a grounding terminal;
   a power supply circuit;
   a switch connected between an output of the power supply circuit and the power supply terminal;
   a capacitor connected to the power supply terminal;
   a discharge resistance and a discharge switch connected in series with each other between the power supply terminal and a ground line; and
   an abnormality detector configured to:
      determine a threshold voltage that decreases according to an elapsed time from turn on of the discharge switch;
      detect an output voltage of the power supply terminal at a plurality of times after the turn on of the discharge switch; and
      detect, based on a temporal change in the output voltage, an abnormality when the output voltage detected at a time of the plurality of times exceeds the threshold voltage corresponding to the time.

10. The electronic apparatus according to claim 9, wherein the threshold voltage is determined for each voltage level immediately previously supplied by the power supply circuit.

11. The electronic apparatus according to claim 9, wherein the abnormality detector is further configured to calculate power based on the output voltage detected at each time, and determine the abnormality when a value obtained by integrating the power at each time exceeds a threshold value.

12. The electronic apparatus according to claim 11, wherein the threshold value is determined for each voltage level immediately previously supplied by the power supply circuit.

* * * * *